(12) United States Patent
Banuelos

(10) Patent No.: US 8,695,534 B2
(45) Date of Patent: Apr. 15, 2014

(54) AUTOMATED ANIMAL FEEDER

(76) Inventor: Antonio Banuelos, Bakersfield, CA (US)

( * ) Notice: Subject to any disclaimer, the term of this patent is extended or adjusted under 35 U.S.C. 154(b) by 574 days.

(21) Appl. No.: 13/092,472

(22) Filed: Apr. 22, 2011

(65) Prior Publication Data

US 2011/0265726 A1    Nov. 3, 2011

Related U.S. Application Data

(60) Provisional application No. 61/328,928, filed on Apr. 28, 2010.

(51) Int. Cl.
    *A01K 5/02*    (2006.01)

(52) U.S. Cl.
    CPC .................... *A01K 5/0208* (2013.01)
    USPC ..................... 119/51.11; 119/57.92

(58) Field of Classification Search
    CPC ................................... A01K 5/0208
    USPC ................. 119/57.2, 57.7, 51.11, 52.1, 57.1, 119/57.92, 56.2; 222/415
    See application file for complete search history.

(56) References Cited

U.S. PATENT DOCUMENTS

| | | | |
|---|---|---|---|
| 4,580,528 A | 4/1986 | Kendall | |
| 4,782,790 A * | 11/1988 | Batson | ............ 119/51.11 |
| 6,681,718 B1 | 1/2004 | McIlarky | |
| 6,779,486 B2 * | 8/2004 | Vaags | ............ 119/51.11 |
| 6,938,652 B1 * | 9/2005 | Harmon, Jr. | ............ 141/98 |
| 7,007,633 B2 | 3/2006 | Dodds | |
| 7,370,605 B2 | 5/2008 | Meritt | |

* cited by examiner

*Primary Examiner* — Rob Swiatek
*Assistant Examiner* — Danielle Clerkley
(74) *Attorney, Agent, or Firm* — James M. Duncan, Esq.; Klein DeNatale Goldner

(57) ABSTRACT

An automated animal feeder may store at least two different varieties of animal feed and automatically dispense a desired amount of feed at specified times of the day. Feed, stored in storage bins, gravitates to a conveying mechanism which transfers the feed to the feeding station. The conveying mechanism, which comprises almost all of the moving parts of the apparatus, is an integrated unit which is easily removed from the housing of the apparatus for maintenance. The volume of feed may be regulated by adjustable panels which control the volume of feed which is transported to the feeding station.

20 Claims, 11 Drawing Sheets

AUTOMATED ANIMAL FEEDER

CROSS-REFERENCE TO RELATED APPLICATIONS

U.S. Provisional Application No. 61/328,928 for this invention was filed on Apr. 28, 2010, for which application this inventor claims domestic priority.

BACKGROUND OF THE INVENTION

The disclosed device generally relates to an automated feeding apparatus for animals, and in particular for large livestock such as cattle, sheep and horses.

Various forms of feeding devices are known which can be used without requiring replenishment of the feed contained therein over a relatively long period of time. However, such devices suffer from several deficiencies when used with horses. Horses need different levels of feed and nutrition in their diet depending on the animal's age, weight, activity level and overall health. It is important that the animal receives a proper balance of proteins, grains, hay, and supplements, thus often requiring a blend of different feeds. However, the prior art automated feeding systems for horses are generally limited to dispensing a single feed at a time, or do not allow for dispensing a proportioned amount of two different feeds. Furthermore, in order to provide satisfactory feeding over relatively long periods of time, it is necessary for the device to have a relatively large storage capacity for storing and protecting sufficient quantities of feed from the elements. In addition to protecting the feed from the elements, it is important to provide controlled access to the feed, such that the correct amount is dispensed to meet the daily needs of the animals.

SUMMARY OF THE INVENTION

Embodiments of the disclosed automated animal feeder dispense multiple feeds at predetermined times of the day. Embodiments of the device may comprise a sufficiently large storage capacity to store sufficient quantities of multiple feeds to last for a number of days without being replenished. The amounts of the various feeds may be independently managed, such that more fibrous feeds are delivered or more grain feeds may be delivered, based upon the nutritional requirements of the animal(s).

The disclosed apparatus dispenses pellet feed and whole or processed grains, including corn, oats, wheat and barley. Pellet feed has several advantages over other feed types. The pellet feed is easy to handle and measure. It is generally consistent in quality while textured feeds are not. Because the nutritional makeup of the feed is the same throughout, it is easier to properly plan an animal's nutritional requirements and consistently implement a feed regimen day in and day out. The pellets also prevent picky eaters from only ingesting the portions of the textured feeds they enjoy while leaving behind that which they will rather not eat.

The disclosed automated animal feeder comprises a storage area for two or more separated types of feed, a timer means for initiating dispensing of the feed from the storage area, one or more quantity regulators for controlling the quantity of feed released from the storage area, and a conveying mechanism for transferring the feed to the feeding station. The conveying mechanism, which comprises almost all of the moving parts of the apparatus, is an integrated unit which is easily removed from the housing of the apparatus for maintenance. The timer means may control the operation of the quantity regulator, and may also control the operation of the conveying means.

The timer means may be any of the commercially available timer means in use, and may be capable of multiple feed times. The quantity regulator(s) may be a gate or similar metering device. Multiple quantity regulators may be utilized to allow for the disbursement of different types of feed. The quantity regulators may be independently operable such that varying amounts of each type of feed may be released. Additionally, the quantity regulators may be operated by the timer such that only one type of feed may be released at a time. The conveying mechanism means may comprise a conveyor belt or chain, an inclined slope, or similar method of transfer, which conveys the feed released from the storage area to the feeding station.

The apparatus may be battery operated or operate from a remote power source. If battery operated, the batteries may be of the rechargeable type. The batteries may be recharged through a solar panel array, thereby allowing the apparatus to be remotely located.

DETAILED DESCRIPTION OF THE EMBODIMENTS

Figure 1:
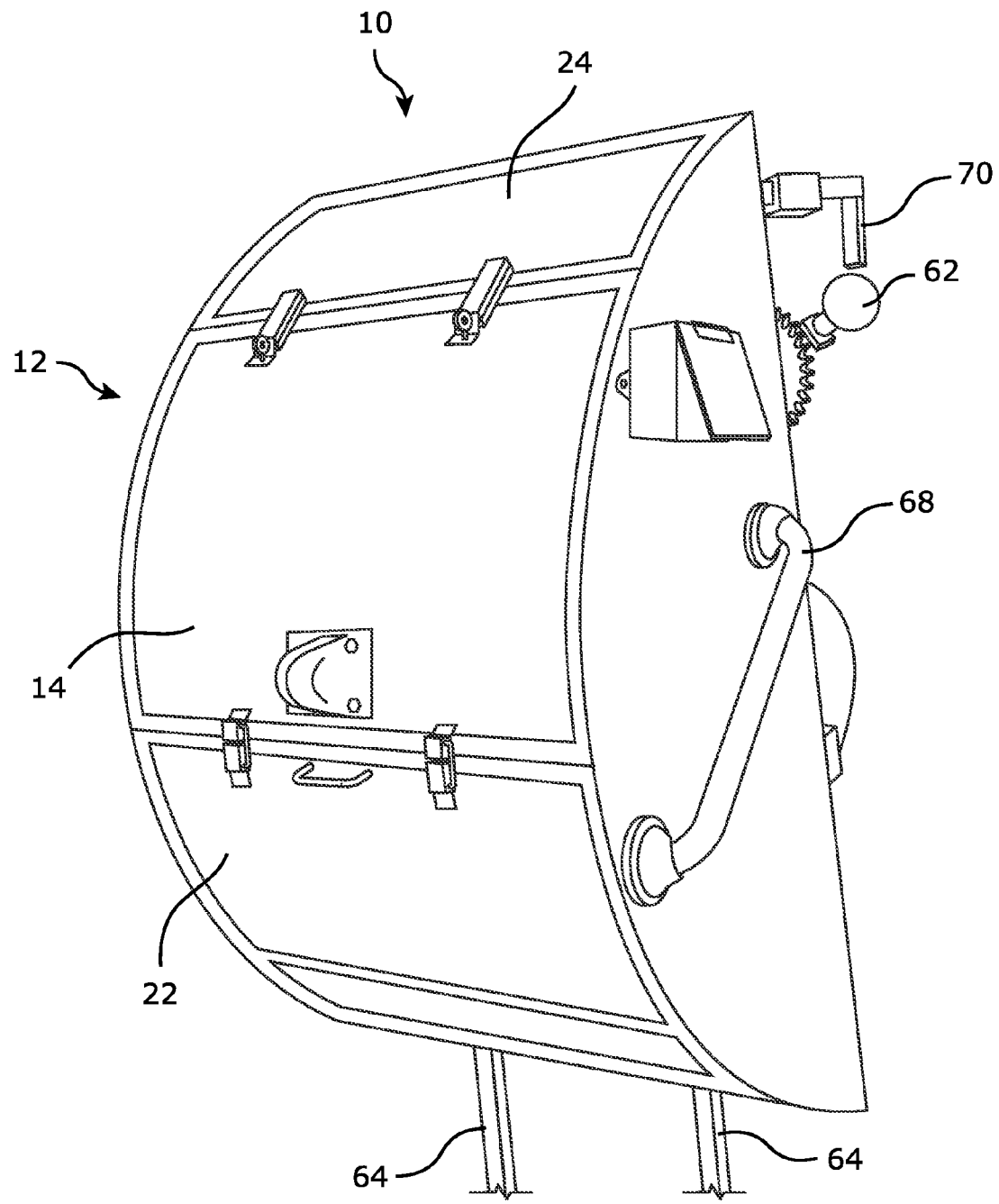
FIG. 1 shows a perspective side view of an embodiment of the disclosed invention.
Figure 2:
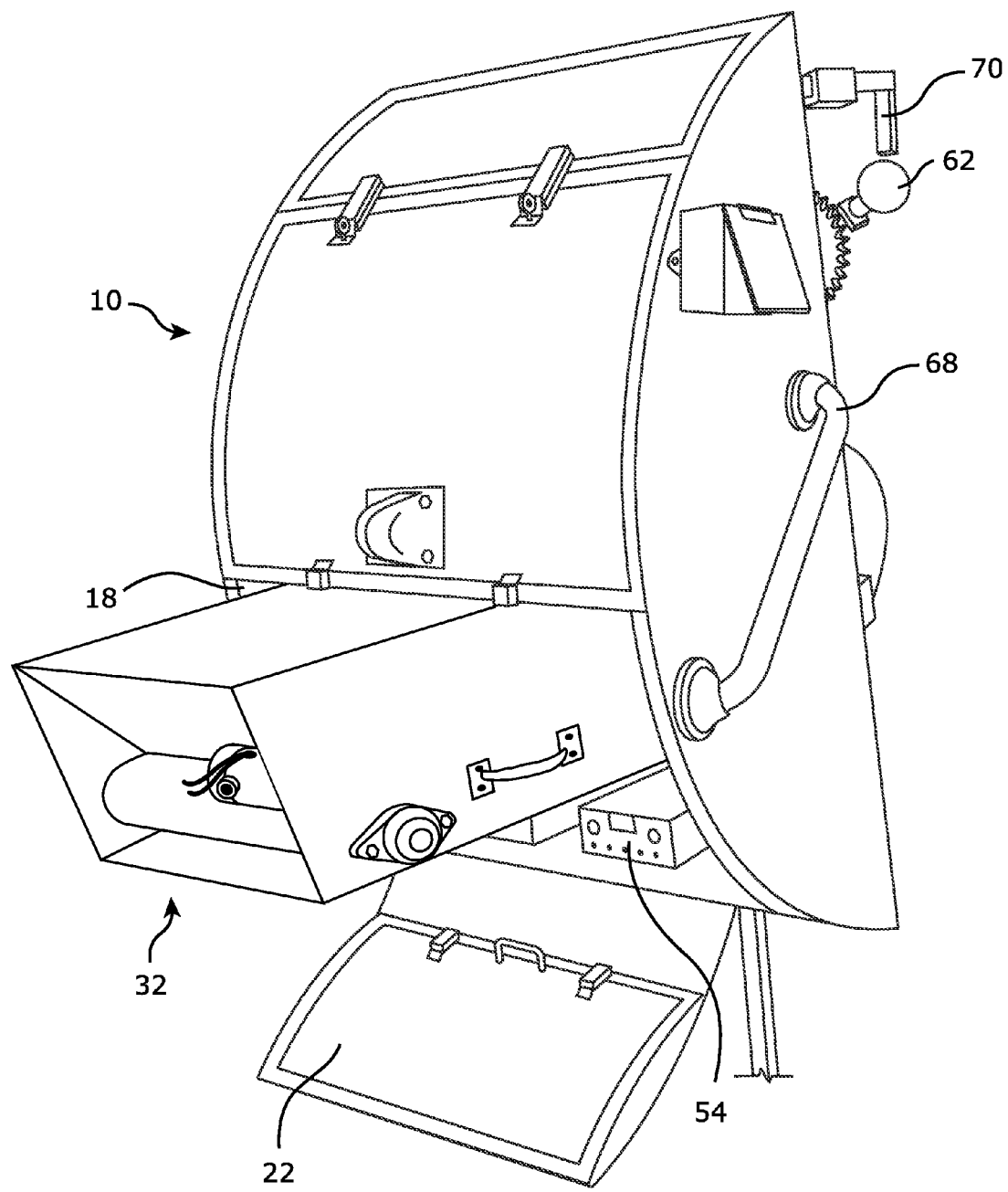
FIG. 2 shows a right side perspective view of an embodiment of the apparatus, showing the integrated conveying mechanism being removed from the housing of the apparatus.
Figure 3:
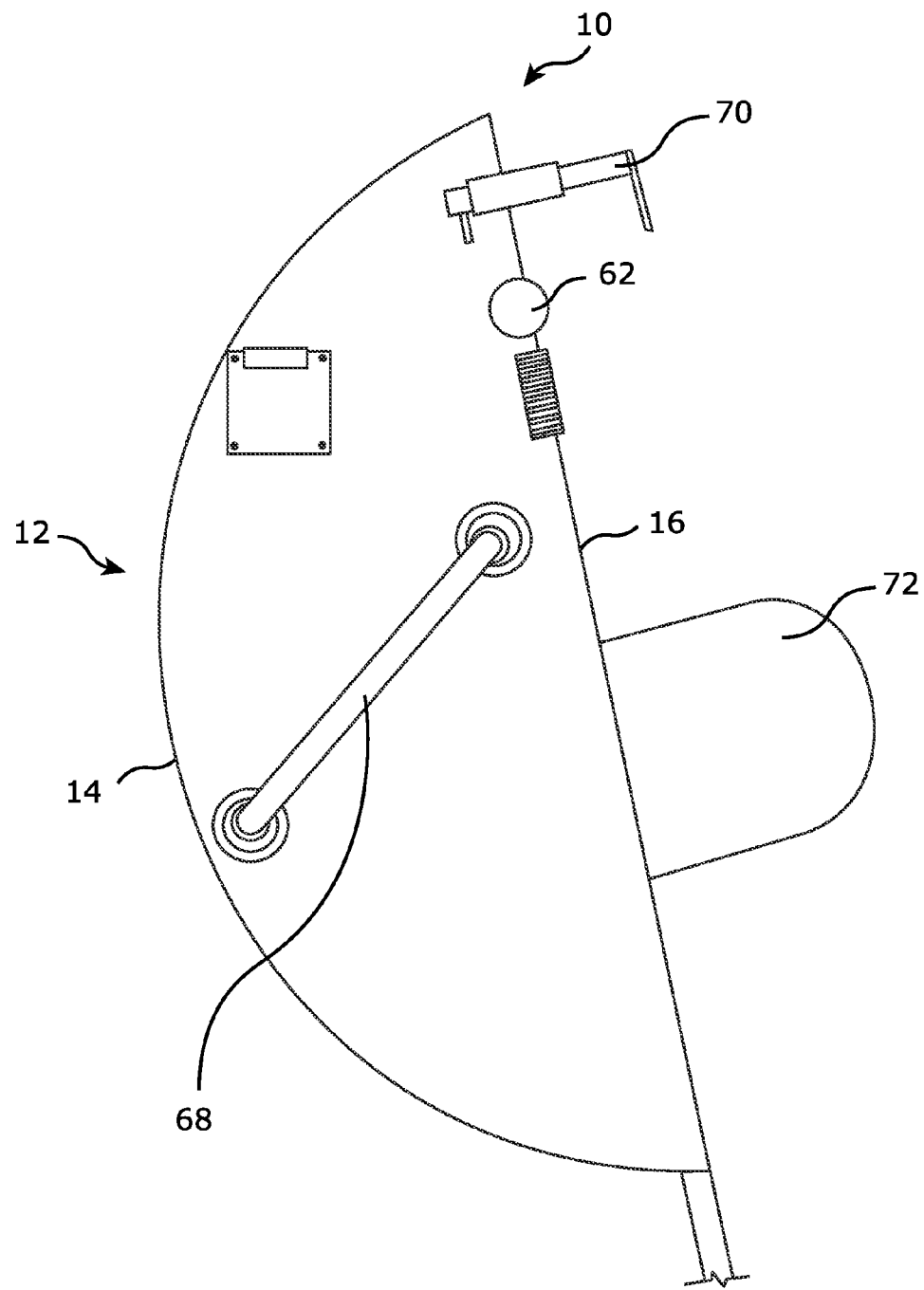
FIG. 3 shows a side view of an embodiment of the apparatus.
Figure 4:
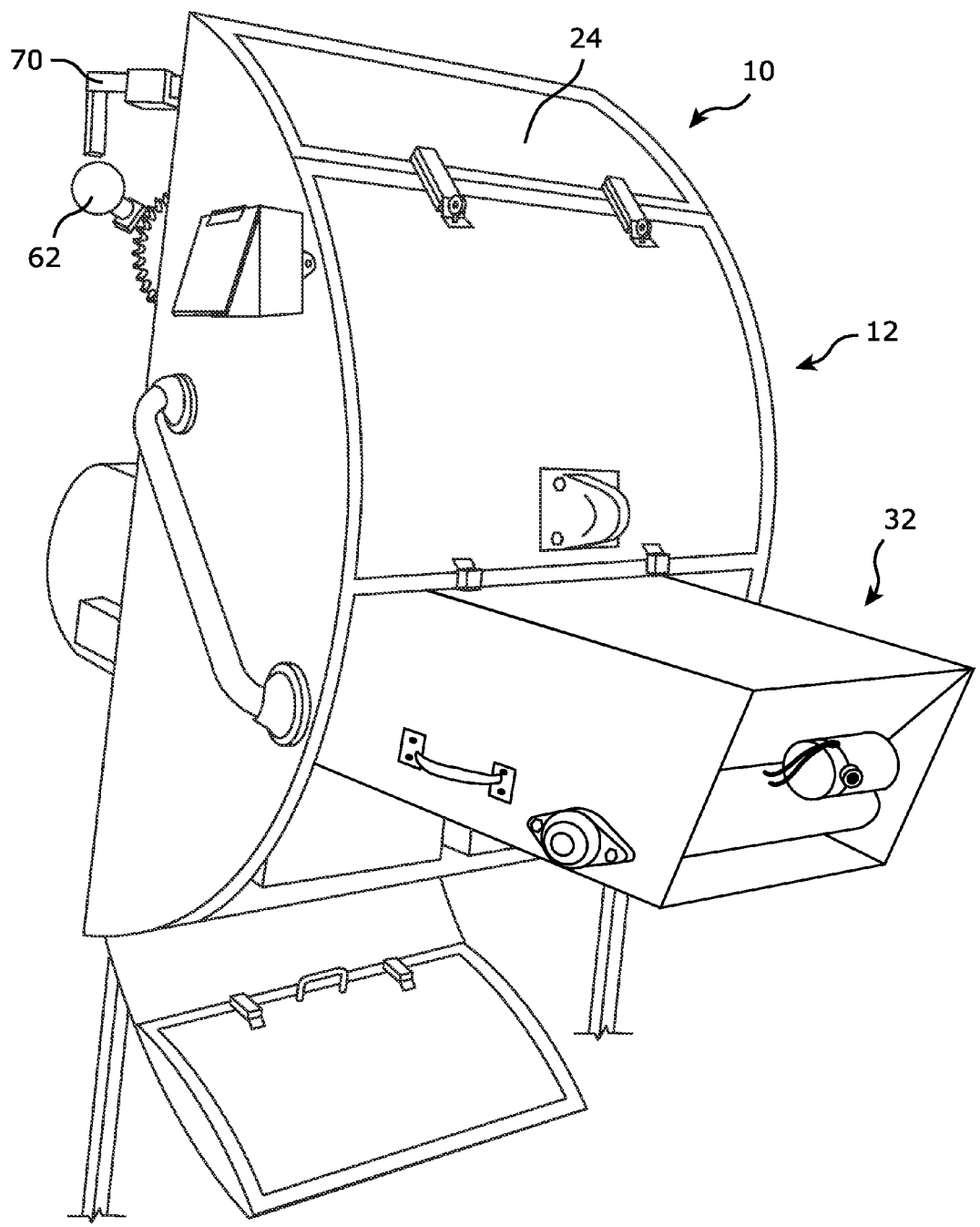
FIG. 4 shows a left side perspective view of an embodiment of the apparatus, showing the integrated conveying mechanism being removed from the housing of the apparatus.
Figure 5:
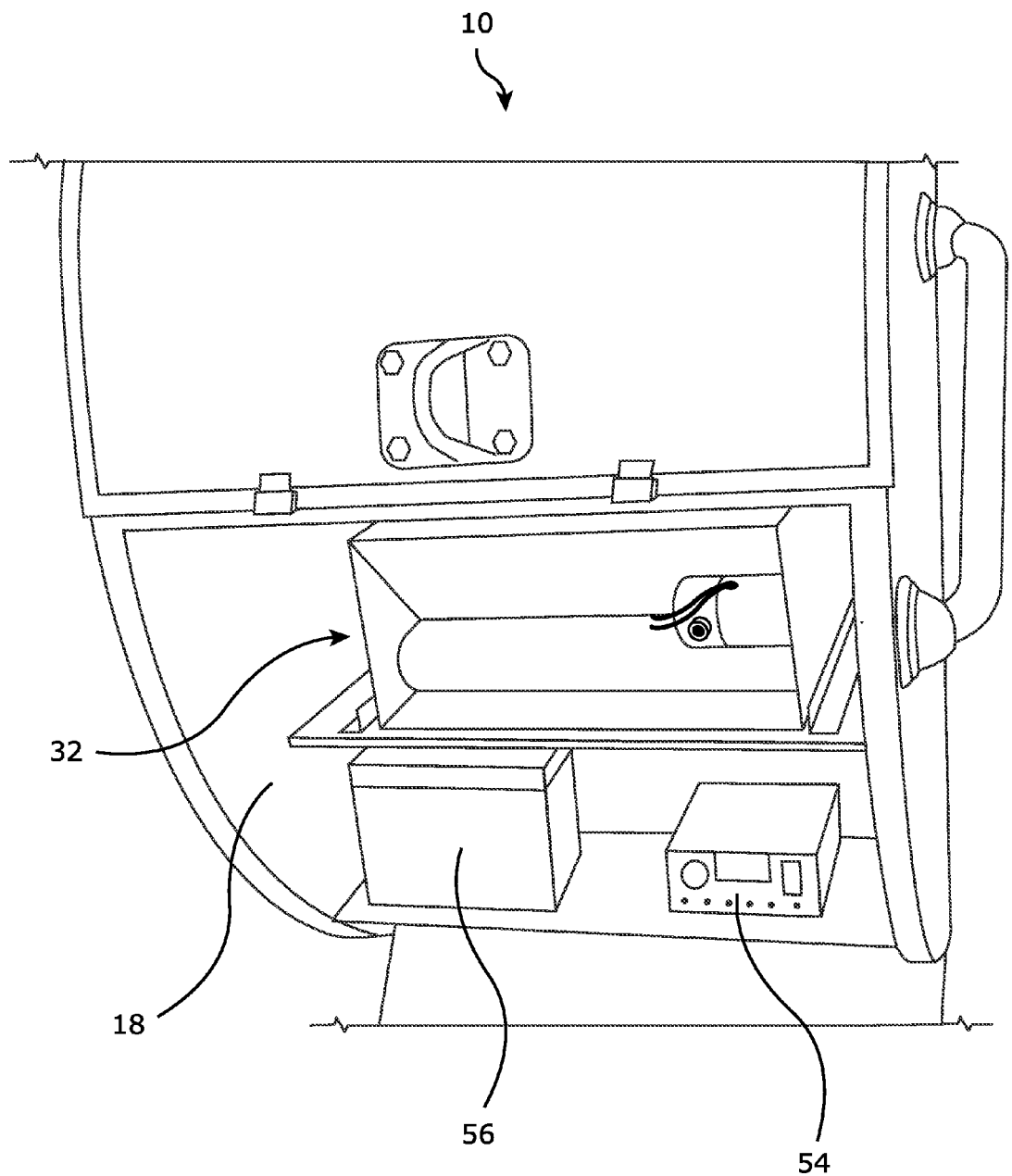
FIG. 5 shows a partial front view of an embodiment of the apparatus with the lower access panel in an open position, the front arbitrarily identified as that portion of the apparatus through which the operator accesses the interior of the apparatus for loading, controlling, and maintenance.

Referring now to the Figures, an embodiment of the disclosed automated animal feeder 10 comprises a housing unit 12 having a front 14 and a back 16. Front 14 has an arcuate configuration which facilitates loading feed into the apparatus, and which allows for the complete insertion of the interior components as discussed in greater detail below. The front 14 further comprises lower opening 18 and upper opening 20. Lower opening 18 may have a pivoting access panel 22 which allows for access to the interior components of the device. Upper opening 20 comprises a feed door 24, which opens up to allow access to a storage space which may be divided by divider 30, which vertically extends through a portion of the housing unit 12, to form storage bins 26, 28. Each of the storage bins 26, 28 is adapted to store a livestock feed. It is to be appreciated that while not shown in the drawings, additional storage bins might be formed by the inclusion of additional dividers 30 inside the housing unit 12.

The back 16 of the housing unit 12 has an opening, which is segmented by divider 30 which may define two feed chutes, a first feed chute 13 and a second feed chute 15. Additional dividers 30 may be utilized to define additional feed chutes, to allow for dispensing a greater variety of livestock feed. First feed chute 13 and second feed chute 15 may dispense into feed receptacles 17, which is set at a height which allows easy access by an animal.

Figure 9:
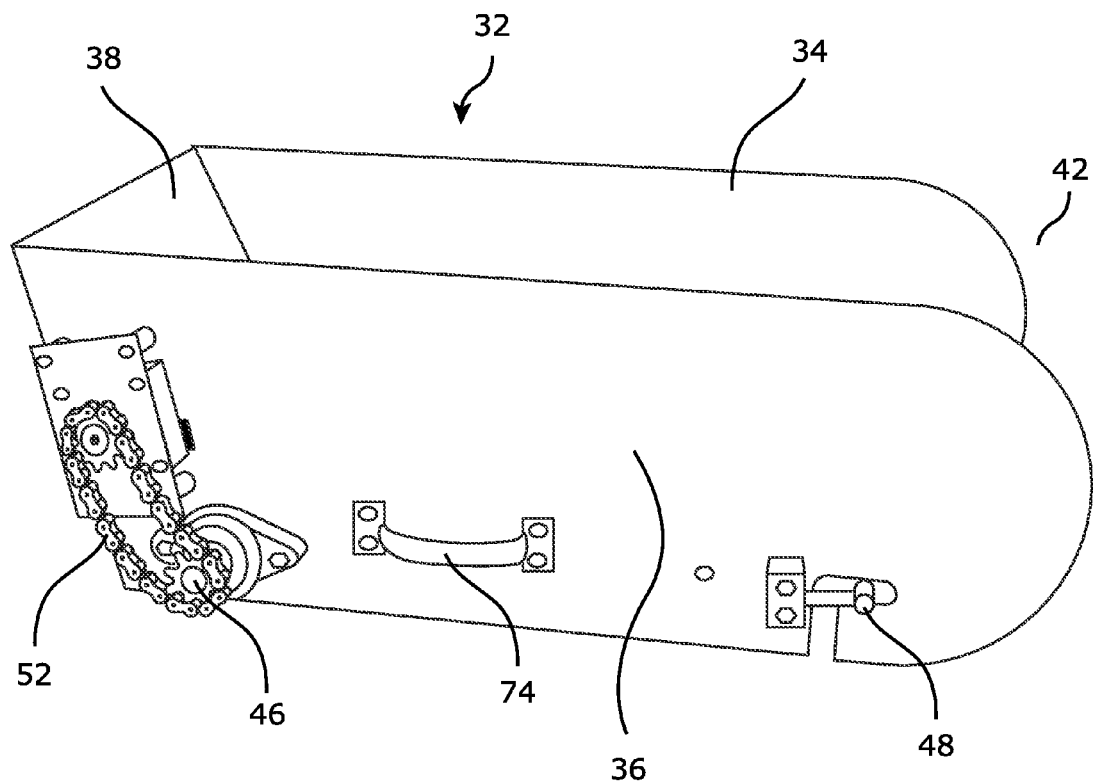
FIG. 9 shows a left side view of an embodiment of the integrated conveying mechanism removed from the housing.
Figure 10:
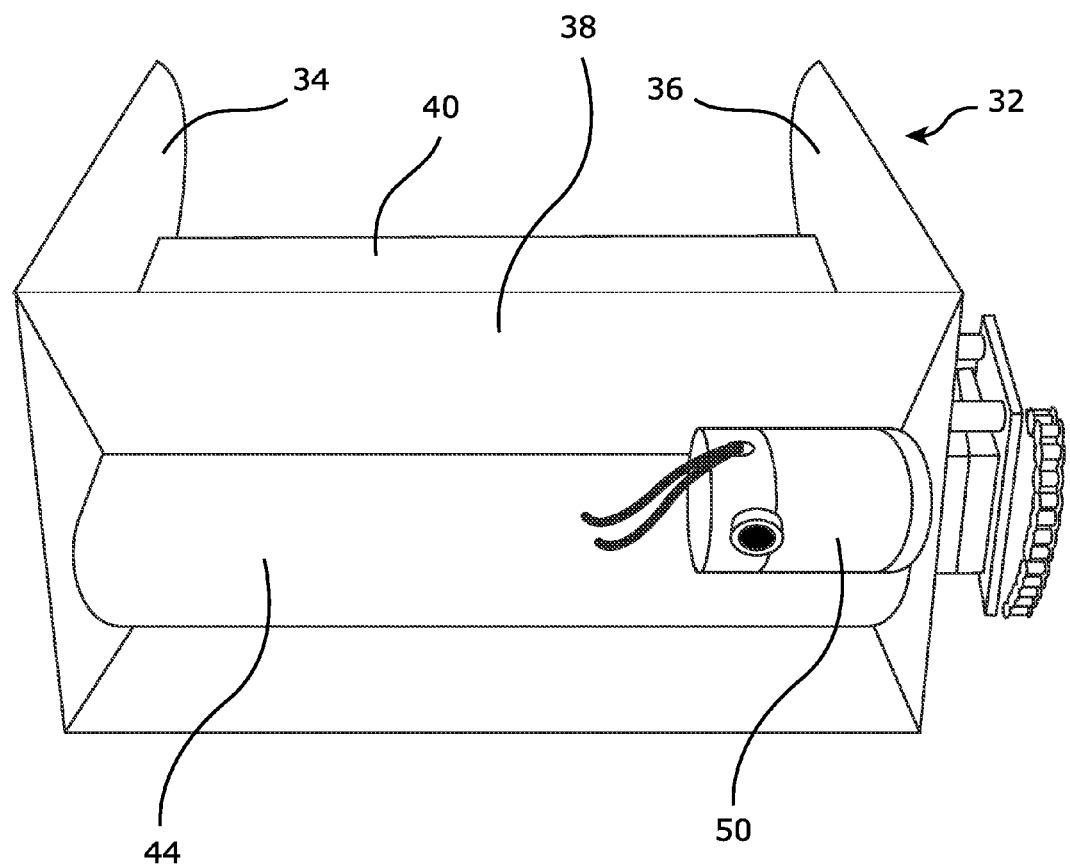
FIG. 10 shows a front view of the integrated conveying mechanism shown in FIG. 9.
Figure 11:
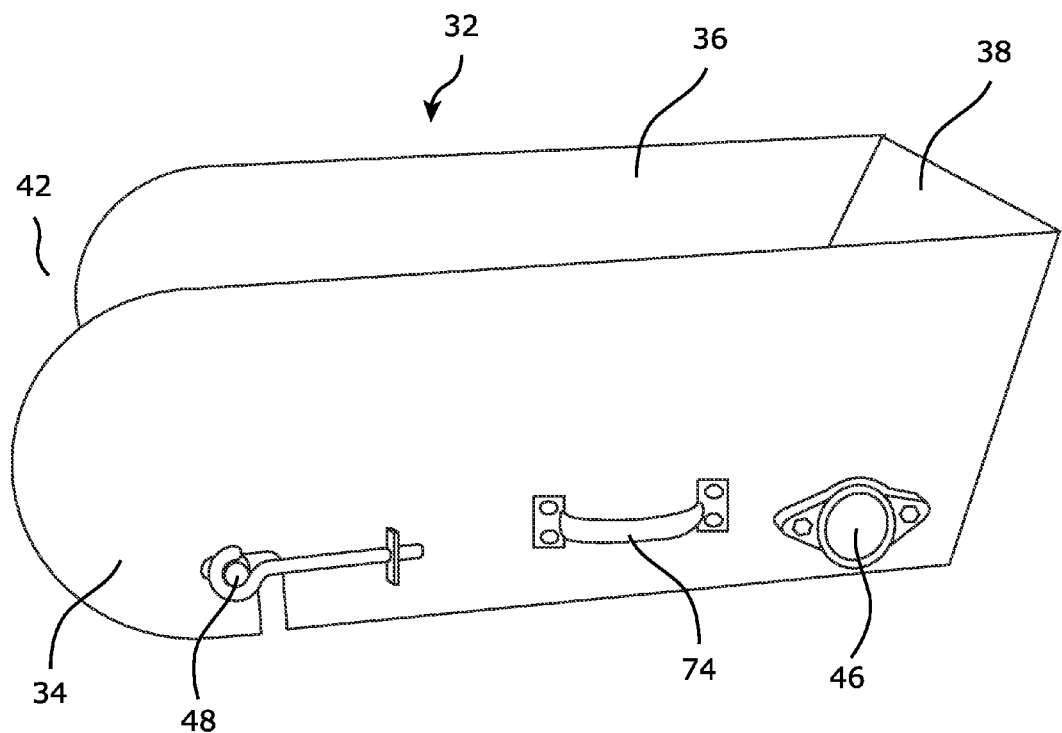
FIG. 11 shows a right side view of the integrated conveying mechanism shown in FIG. 9.

The apparatus 10 further comprises a conveyor unit 32 which is slideably removable from the housing unit 12. As best shown in FIGS. 9 through 11, the conveyor unit 32 forms a tray unit having opposing side panels 34, 36. The conveyor unit 32 also has a front panel 38, which is so named because it is oriented in the same direction as the front 14 of the housing unit 12 when the conveyor unit 32 is installed within the apparatus 10. The conveyor unit 32 has a bottom 40, which forms the floor of the storage bins 26, 28. The conveyor unit 32 further has an open tray end 42 opposite the front panel 38. When installed within the housing unit 12, the open tray end 42 faces the opening through which feed is dispersed through the first feed chute 13 and the second feed chute 15, where the continuous belt conveyor 44 delivers feed through the openings.

Conveyor unit 32 further comprises a continuous belt conveyor 44 which is disposed between a drive roller 46 and an idler roller 48, wherein a portion of the continuous belt conveyor forms the bottom of the tray. In this manner, feed loaded into the storage bins 26, 28 is gravity fed into the conveyor unit, and delivered to the first feed chute 13 and the second feed chute 15. A motor 50 is operationally attached to drive roller 46, such as by a chain 52 which is attached to a gear attached to the drive roller. Upon activation by motor 50, the continuous belt conveyor 44 transfers feed, which has been disposed on the continuous belt conveyor through upper opening 20, toward the back of the housing unit 12 and through the first feed chute 13 and the second feed chute 15.

The motor 50 is controlled by a control means, such as digital processor 54. Digital processor 54 may be programmed by the user to periodically actuate the motor 50 for a specified time at a predetermined time of day, causing the continuous belt conveyor 44 to transfer a portion of the first livestock feed and a portion of the second livestock feed to the feed receptacles 17. Because the operational time (i.e., the length of time the motor actually runs) of the continuous belt conveyor 44 may be controlled, the volume of feed being delivered to the feed receptacles 17 may also be controlled. Digital processor 54, or an analog controller if used, may provide for multiple operating times on a daily basis, such that feed may dispensed multiple times per day as desired by the user.

A power means, such as battery 56, may be utilized to provide the required current to the motor 50 and digital processor 54. Battery 56 may be of the type which is rechargeable. For remote locations, battery 56 may be attached to a solar panel, such that the battery is recharged by sunlight, which allows the apparatus to be utilized in locations which do not have immediate access to electrical distribution facilities.

The storage area 12 should have a capacity sufficient to store at least 5 days of feed for a single animal. The arcuate shape of the device as shown in the figures provides a suitable internal volume for storage, while also providing sufficient head for delivery of the feed and allowing room for the internal operating mechanisms.

Figure 6:
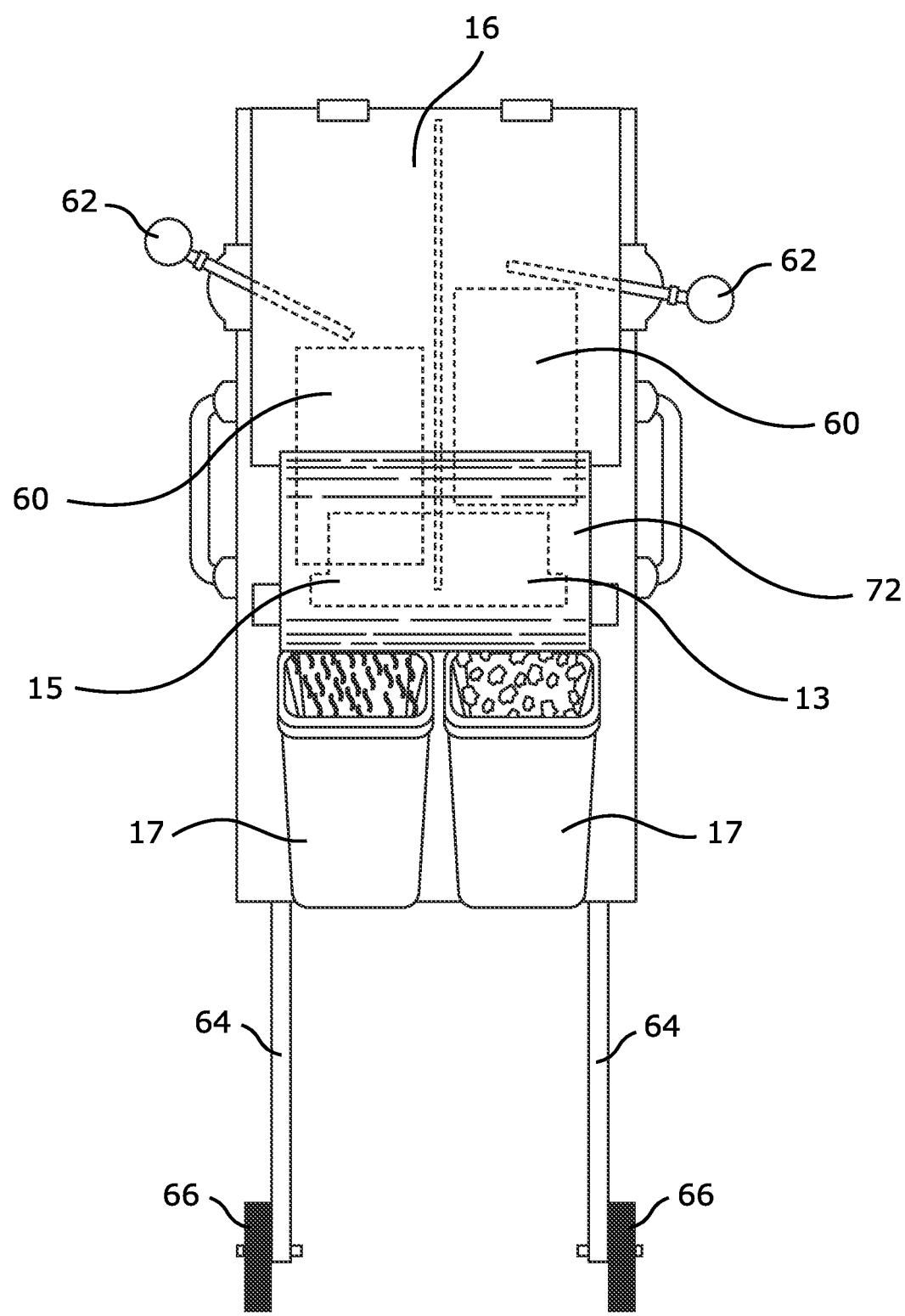
FIG. 6 shows a rear view of an embodiment of the apparatus showing feed stations and the feed quantity regulators.

The apparatus may further comprise a regulator means which controls the amount of feed being dispensed to the feed receptacles 17. As shown in FIG. 6, the back 16 of the housing unit 12 may have regulating panels 60, each which is slideably disposed against a feed chute 13, 15. In FIG. 6, the regulating panels are shown in hidden view because the panels may be covered by a back panel and also by hood 72, but the regulating panels may be fully exposed as well. The position of each regulating panel 60 with respect to a feed chute 13, 15, defines a dispensing area, under which continuous belt conveyor 44 may extend. The regulating panels will only allow a certain volume of feed to be dispensed through the dispensing area at a time because the relative position of each regulating panel limits the height of the feed being transported by the continuous belt conveyor which extends beneath the regulating panels, such that the volume of food is limited. Utilizing a separate regulating panel 60 for each feed chute 13, 15, allows the user to control the relative volumes of the feeds being dispensed. For example, a first regulating panel 60 adjacent to a first feed chute 13 may be placed in a fully opened position, while a second regulating panel adjacent to a second feed chute 15 may be partially closed, thus allowing a greater volume of feed to be transferred through the first feed chute than through the second feed chute for a specific amount of time during which the continuous belt conveyor is in operation. For each feed delivery period, it is anticipated that the continuous belt conveyor 44 will only operate for a manner of seconds.

Figure 7:
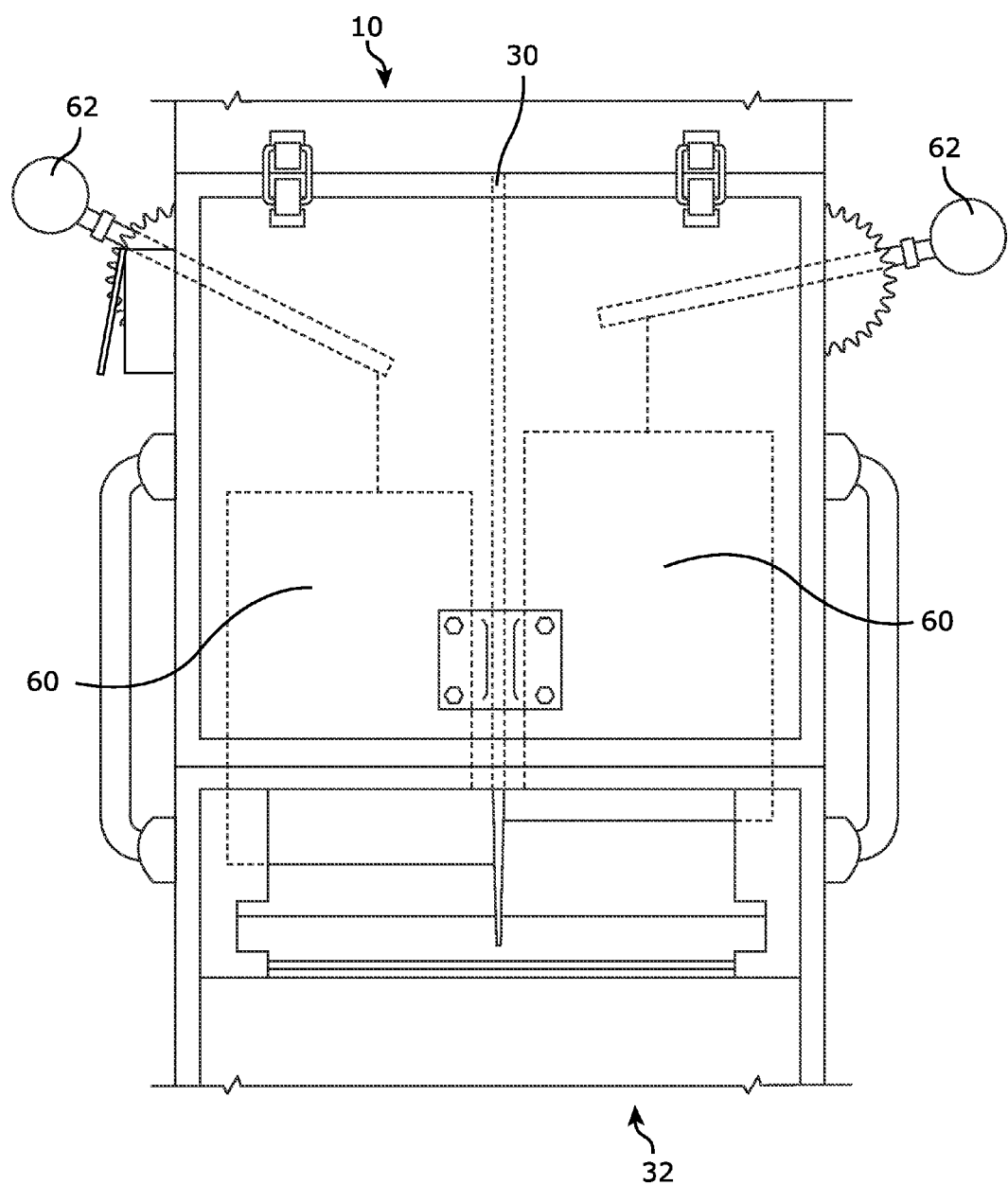
FIG. 7 shows a front view of an embodiment of the apparatus, showing, by hidden line, the feed quantity regulators.
Figure 8:
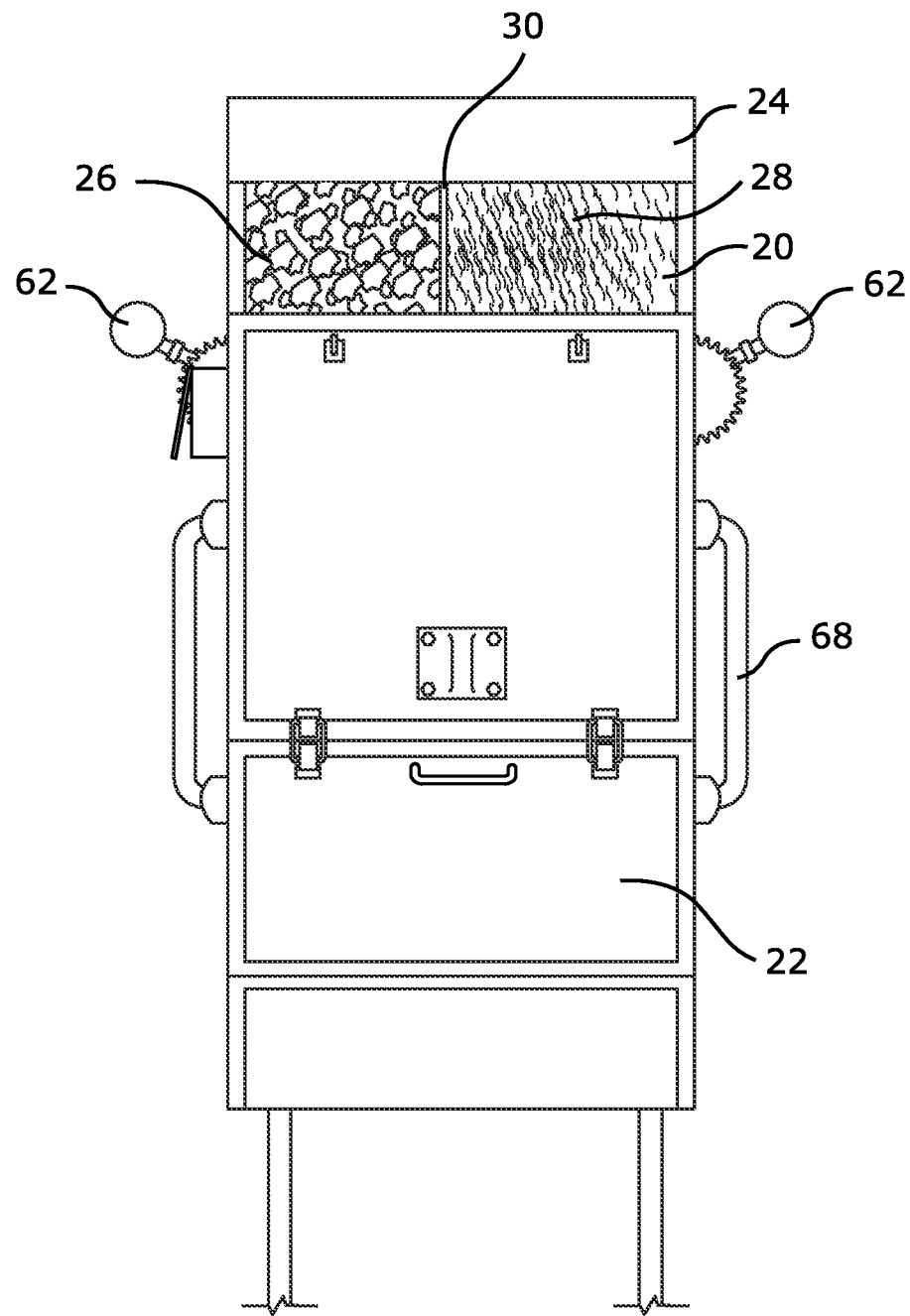
FIG. 8 shows a front view of an embodiment of the apparatus, showing the access panel to the feed storage compartments in an open position.

The regulating panels 60 may be operated by activation lever 62, which are operationally connected to the regulating panels by a connection means such as a rod or chain as indicated in FIG. 7. As further shown in FIG. 7, a front view of the housing which shows the regulating panels 60 in hidden view, the activation levers 62 may have a range of different positions which allow the user to select a particular dispensing area for a particular feed, allowing the user to independently control the amount of each feed being dispensed to the feed receptacles 17.

Embodiments of the apparatus 10 may be free standing, and utilize legs 64. As shown in FIG. 6, the legs may also comprise wheels 66 for facilitating movement of the device. The apparatus may also comprise handles 68 for facilitating the lifting of the device. The apparatus may also comprise hangers 70 which allow the apparatus to be hung from a supporting structure, such as the rail of a corral or pen. A hood 72 may be placed over the feed receptacles 17 to prevent rain or other moisture from getting into feed which has been dispensed into the receptacles. Conveyor unit 32 may comprise handles 74 to facilitate insertion and removal of the conveyor unit 32 from the housing unit 12.

While the above is a description of various embodiments of the present invention, further modifications may be employed without departing from the spirit and scope of the present invention. Thus the scope of the invention should not be limited by the specific structures disclosed. Instead the true scope of the invention should be determined by the appended claims.

What is claimed is:
1. An automated animal feeding apparatus comprising:
a housing unit having a front and a back, the back of the housing unit comprising an opening and a feed receptacle adjacent to the opening;
a first storage bin and a second storage bin defined by a vertical divider extending through a portion of the hous- ing unit, the first storage bin adapted to store a first livestock feed and the second storage bin adapted to store a second livestock feed;

a conveyor unit, slideably removable from the housing unit, the conveyor unit comprising a tray comprising a first side panel, a second side panel, a front side panel, a bottom, and an open tray end opposite the front side panel, wherein when installed within the housing unit, the open tray end adjacent to the opening, and the first storage bin and the second storage bin having a floor defined by the tray;

the conveyor unit further comprising a continuous belt conveyor disposed between a drive roller and an idler roller, wherein a portion of the continuous belt conveyor forms the bottom of the tray;

a motor operationally attached to the drive roller;

control means which periodically actuate the motor for a specified time at a predetermined time of day, causing the continuous belt conveyor to transfer a portion of the first livestock feed and a portion of the second livestock feed to the feed receptacle; and power means for the motor and the control means.

2. The automated animal feeding apparatus of claim 1 wherein the back of the housing unit further comprises a first regulating panel slideably disposed against a first portion of the opening and an adjacent second regulating panel slideably disposed against a second portion of opening wherein a first dispensing area is defined by the position of the first regulating panel with respect to the first portion of the opening and a second dispensing area is defined by the position of the second regulating panel with respect to the second portion of the opening, and the feed receptacle is disposed adjacent to the to the first dispensing area and the second dispensing area.

3. The automated animal feeding apparatus of claim 2 wherein a first activation lever is operationally linked to the first regulating panel and a second activation lever is operationally linked to the second regulating panel, wherein the first activation lever and the second activation lever each comprise a range of positions for respectively adjusting the size of the first dispensing area and the second dispensing area.

4. The automated animal feeding apparatus of claim 1 wherein the motor is mounted on the conveyor unit.

5. The automated animal feeding apparatus of claim 4 wherein the motor is connected to a first gear and the drive roller is connected to a second gear, and the first gear is operationally connect to the second gear.

6. The automated animal feeding apparatus of claim 1 wherein the control means comprises a digital processor.

7. The automated animal feeding apparatus of claim 1 wherein the control means comprises an analog timer.

8. The automated animal feeding apparatus of claim 1 wherein the power means comprises a rechargeable battery.

9. The automated animal feeding apparatus of claim 1 comprising means for attaching the apparatus to a livestock enclosure.

10. An automated animal feeding apparatus comprising:

a housing unit having a front and a back, the back of the housing unit comprising a first feed chute and a second feed chute, a first regulating panel slideably disposed against the first feed chute and a second regulating panel slideably disposed against the second feed chute wherein a first dispensing area is defined by the position of the first regulating panel with respect to the first feed chute and a second dispensing area is defined by the position of the second regulating panel with respect to the second feed chute, the back of the housing unit further comprising a feed receptacle adjacent to the first dispensing area and the second dispensing area;

at least two side-by-side and divided storage bins defined by a interior vertical divider extending through a portion of the housing unit, each storage bin adapted to store a livestock feed;

a conveyor unit, slideably removable from the housing unit, the conveyor unit comprising a tray comprising a first side panel, a second side panel, a front side panel, a bottom, and an open tray end opposite the front side panel, wherein when installed within the housing unit, the open tray end is adjacent to the first feed chute and the second feed chute, and the tray defines the floor of the storage bins;

the conveyor unit further comprising a continuous belt conveyor disposed between a drive roller and an idler roller, wherein a portion of the continuous belt conveyor forms the bottom of the tray;

a motor operationally attached to the drive roller;

control means which periodically actuate the motor for a specified time at a predetermined time of day, causing the continuous belt conveyor to transfer a portion of livestock feed to the feed receptacle; and power means for the motor and the control means.

11. The automated animal feeding apparatus of claim 10 wherein a first activation lever is operationally linked to the first regulating panel and a second activation lever is operationally linked to the second regulating panel, wherein the first activation lever and the second activation lever each comprise a range of positions for respectively adjusting the size of the first dispensing area and the second dispensing area.

12. The automated animal feeding apparatus of claim 10 wherein the motor is mounted on the conveyor unit.

13. The automated animal feeding apparatus of claim 12 wherein the motor is connected to a first gear and the drive roller is connected to a second gear, and the first gear is operationally connect to the second gear.

14. The automated animal feeding apparatus of claim 10 wherein the control means comprises a digital processor.

15. The automated animal feeding apparatus of claim 10 wherein the control means comprises an analog timer.

16. The automated animal feeding apparatus of claim 10 wherein the power means comprises a rechargeable battery.

17. The automated animal feeding apparatus of claim 10 comprising means for attaching the apparatus to a livestock enclosure.

18. An automated animal feeding apparatus comprising:

a housing unit having a front and a back, the back of the housing unit comprising a first feed chute and a second feed chute, a first regulating panel slideably disposed against the first feed chute and a second regulating panel slideably disposed against the second feed chute wherein a first dispensing area is defined by the position of the first regulating panel with respect to the first feed chute and a second dispensing area is defined by the position of the second regulating panel with respect to the second feed chute, the back of the housing unit further comprising a feed receptacle adjacent to the first dispensing area and the second dispensing area;

at least two side-by-side and divided storage bins defined by a vertical divider extending through a portion of the housing unit, each storage bin is adapted to store a livestock feed;

a conveyor unit, slideably removable from the housing unit, the conveyor unit comprising a tray comprising a first side panel, a second side panel, a front side panel, a bottom, and an open tray end opposite the front side panel, wherein when installed within the housing unit, the open tray end is adjacent to the first feed chute and the second feed chute and the tray defines the floor of the first storage bin and the second storage bin;

the conveyor unit further comprising a continuous belt conveyor disposed between a drive roller and an idler roller, wherein a portion of the continuous belt conveyor forms the bottom of the tray;

the conveyor unit further comprising a motor operationally attached to the drive roller by a chain;

control means which periodically actuate the motor for a specified time at a predetermined time of day, causing the continuous belt conveyor to transfer livestock feed to the feed receptacle; and power means for the motor and the control means.

19. The automated animal feeding apparatus of claim 18 wherein the control means comprises a digital processor.

20. The automated animal feeding apparatus of claim 18 wherein the control means comprises an analog timer.

* * * * *